United States Patent [19]
Takasan et al.

[11] Patent Number: 6,089,362
[45] Date of Patent: Jul. 18, 2000

[54] NON-CONTACT POWER SUPPLY DEVICE AND METHOD FOR CONVEYOR CARRIAGE

[75] Inventors: Masaki Takasan; Tadashi Kondo; Yasuharu Odachi, all of Kariya, Japan

[73] Assignee: Kabushiki Kaisha Toyoda Jidoshokki Seisakusho, Aichi-Ken, Japan

[21] Appl. No.: 08/923,444

[22] Filed: Sep. 4, 1997

[30] Foreign Application Priority Data

Sep. 5, 1996 [JP] Japan .................................. 8-235138

[51] Int. Cl.[7] ........................................................ B60L 9/00
[52] U.S. Cl. ........................................ 191/10; 191/2
[58] Field of Search .......................... 191/10, 2, 3, 32

[56] References Cited

U.S. PATENT DOCUMENTS 4,331,225  5/1982  Bolger .................................... 191/10
5,467,718  11/1995  Shibata et al. ......................... 191/10
5,539,296  7/1996  Ito ........................................... 320/2
5,709,291  1/1998  Nishino et al. ......................... 191/10

FOREIGN PATENT DOCUMENTS

5207606  8/1993  Japan .
8072709  3/1996  Japan .

*Primary Examiner*—S. Joseph Morano
*Attorney, Agent, or Firm*—Morgan & Finnegan, L.L.P.

[57] ABSTRACT

An apparatus for feeding electric power to a movable body in a non-contact manner. Power lines on which electric power is transmitted are laid on a guide rail. The movable body is powered by the electric power from the power lines. A plurality of pick-up coils are positioned in the movable body for generating induced electromotive force as a drive voltage according to the electric power. The plurality of coils generate different voltages. A motor and a controller are connected to the coils. A motor is driven by a high voltage while the controller is driven by a low voltage.

4 Claims, 5 Drawing Sheets

PRIOR ART

NON-CONTACT POWER SUPPLY DEVICE AND METHOD FOR CONVEYOR CARRIAGE

BACKGROUND OF THE INVENTION

The present invention relates to a non-contact power supply device for supplying electric power to a movable body running on a guide rail and to a pickup coil unit mounted on the movable body. More particularly, the pickup coil unit generates induced electromotive force based on a current along the guide rail. The electromotive force generates electric power. The electric power is supplied to the movable body through the pickup coil unit.

A transfer system including a movable body that moves along a guide rail has been proposed and is in use. This system ensures efficient distribution within a factory or a warehouse. A motor is generally used to move a movable body. The motor for moving the movable body is referred to as a drive motor. Electric power, which generally has a voltage of 200 volts, is supplied to the motor via power supply lines (trolley lines) that are laid along the guide rail.

There are two ways to supply electric power to the motor: the trolley system and the non-contact system. In the trolley system, as a collector ring provided in a movable body contacts the power supply lines, electric power is supplied to the movable body. In the non-contact system, a pickup coil is provided on a movable body at a position close to the power supply lines. This pickup coil generates induced electromotive force, and electric power is supplied to the movable body. In the trolley system, contact between a collector ring and a power supply line has a number of drawbacks. Specifically, the contact wears the collector ring and generates particulates and spark. Therefore, the collector ring must be frequently maintained. The non-contact system does not have such drawbacks. Thus, much attention has been focused on the non-contact system, which is superior to the trolley system.

For operating a movable body, electric power needs to be supplied to the drive motor for moving the movable body as well as to a control system. Further, it the movable body has loading equipment (for example, a forklift device) for loading and unloading loads, electric power must be supplied to the loading equipment. Power must also be supplied to relays for sequential control. A power system that has the drive motor and the loading equipment, relays for sequential control and the control system, which includes micro computers, requires different voltages. Specifically, the power system requires relatively high voltage, whereas computers require relatively low voltage. Thus, voltage supplied from the pickup coil is converted into different voltages, each corresponding to one of the devices.

Figure 10:
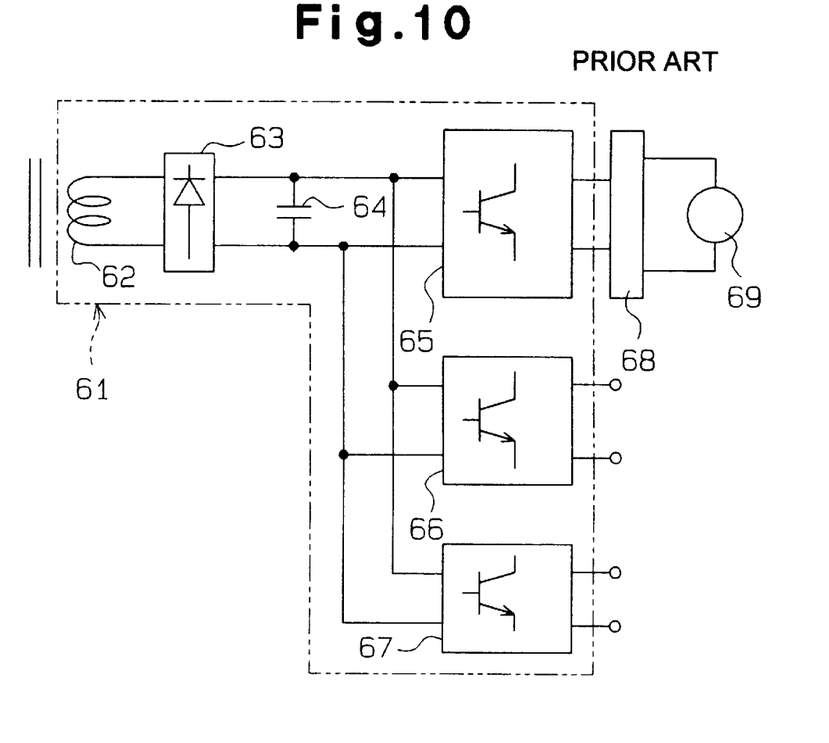
FIG. 10 is a circuit diagram illustrating a prior art power supply unit.

When different voltages are required, the movable body is provided with a power supply unit 61 illustrated in FIG. 10. The power supply unit 61 includes a rectifier circuit 63, a smoothing capacitor 64 and chopper circuits 65, 66, 67. A pickup coil 62 is connected to the input terminals of the rectifier circuit 63. The chopper circuit 65, which outputs the highest voltage (for example DC 300V), is connected to a drive motor 69, with an inverter 68 located in between. The chopper circuit 66, which outputs a lower voltage (for example, DC24V) is connected to relays (not shown) for sequential control. The chopper circuit 67, which outputs the lowest voltage (for example, DC12V) is connected to a controller (not shown) having a central processing unit (CPU). The voltage generated in the single pickup coil 62 is initially rectified by the rectifier circuit 63 and then converted by the chopper circuits 65–67 into voltages required by the individual devices.

The power system and the control system in the movable body require largely different voltages. In the above described prior art movable body, the power system and the control systems share the single coil 62. The chopper circuits 65 to 67 therefore must have the same withstand voltage even if the devices connected to the chopper circuits 65 to 67 require different voltages. In other words, the chopper circuit 67, which outputs the lowest voltage, must have a high withstand voltage. This increases the cost of the chopper circuits 65 to 67. Further, since the chopper circuits 65 to 67 share the common electric power source, a surge current caused by switching of the relays affects the other systems, and noise in the power system affects the control system.

Non-contact systems have a so-called drooping characteristic, which means that the greater the output current becomes, the lower the output voltage becomes. For example, the power system of a stacker crane includes a drive motor for moving the crane and an elevator motor for elevating loads. When the crane is moved and a load is elevated simultaneously, a large amount of current is fed to the motors, while the voltage supplied to the motors is lowered. This may result in insufficient electric power for the motors.

SUMMARY OF THE INVENTION

Accordingly, it is an objective of the present invention to provide a non-contact power supply device that supplies stable electric power to a plurality of electricity consuming devices.

It is another objective of the present invention to provide a pickup coil unit that is suitable for the non-contact power supply device.

To achieve the above objective, the present invention provides an apparatus for feeding electric power to a movable body in a non-contact manner. The movable body runs on a guide rail. The apparatus includes an electric power line, laid along the guide rail, wherein the movable body is powered by electric power from the power line. A plurality of coils including a first coil, which are positioned in the movable body, is provided for generating induced electromotive force as a drive voltage according to the electric power, and wherein the plurality of coils generate different voltages. A plurality of loads including a first load are connected to the coils. The voltage generated by the first coil drives the first load while the voltages generated by another coils drive other load.

The present invention also provides a coil unit suitable for a system for feeding electric power to a movable body in a non-contact manner. The coil unit is positioned in the movable body for generating a drive voltage for the movable body according to the electric power, which is transmitted on power lines. The coil unit includes a core made of magnetic substance, a plurality of coils wound about the core for generating induced electromotive force according to the electric power, and wherein the plurality of coils generate voltages that are different from one another.

The present invention also provides a method for feeding electric power to the movable body in a non-contact manner. The movable body having a plurality of coils and a plurality of loads. The method includes transmitting electric power on power lines laid on guide rails, wherein the movable body runs on the electric power from the power lines, generating different voltages from each coil according to the electric power; and supplying one of the voltages to each load.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with the objects and advantages thereof, may best be understood by reference to the following description of the presently preferred embodiments together with the accompanying drawings.

FIG. 9($a$) is a diagrammatic side view illustrating a pickup coil unit according to another embodiment;

FIG. 9($b$) is a diagrammatic side view illustrating a pickup coil unit according to another embodiment.

DETAILED DESCRIPTION OF THE PREFERRED EMBODIMENTS

An unmanned conveying system according to a first embodiment of the invention will now be described with reference to FIGS. 1 to 5. A carriage of this conveying system runs on a guide rail laid on a ceiling.

Figure 2:
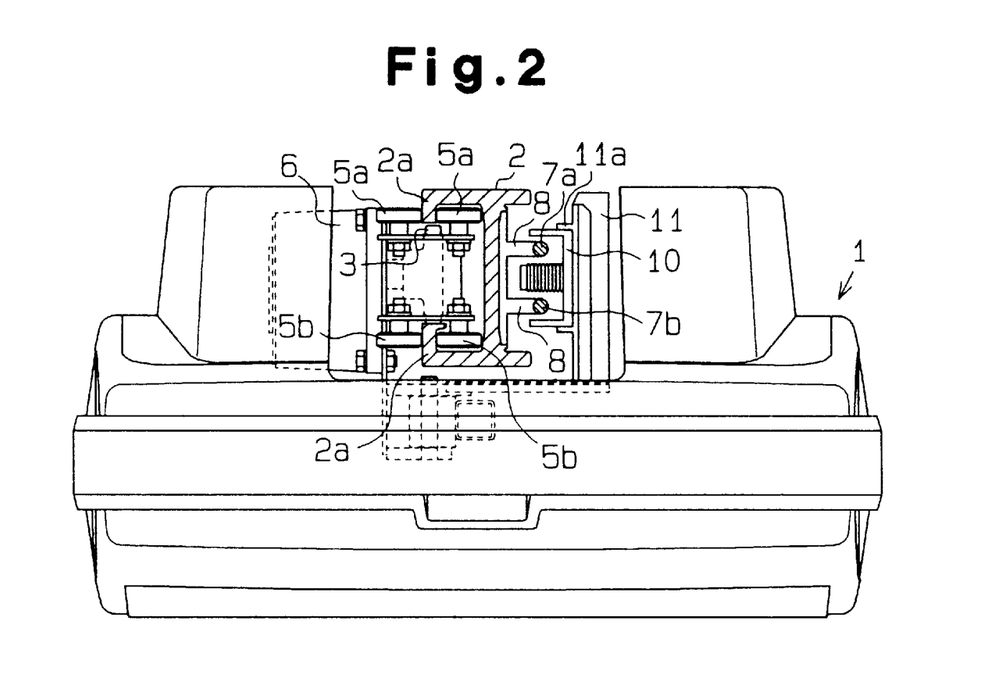
FIG. 2 is a front view illustrating a carriage according to the first embodiment.
Figure 3:
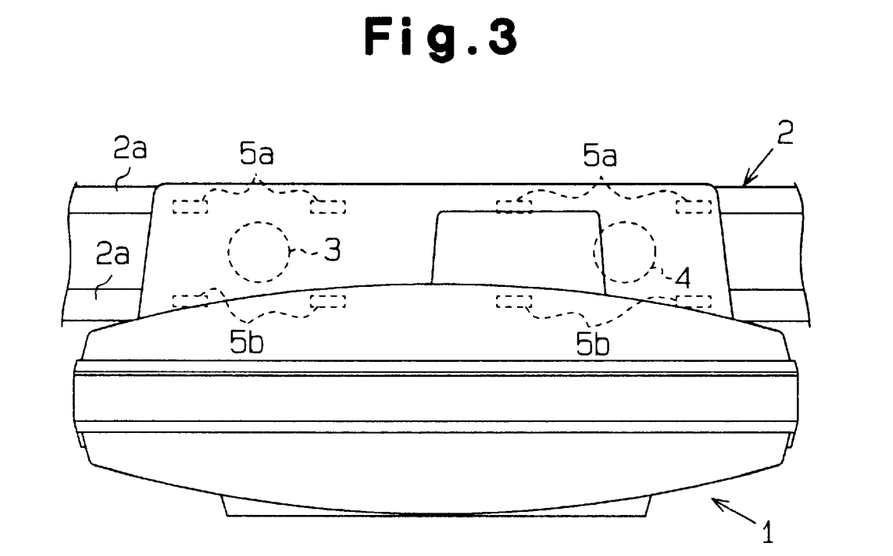
FIG. 3 is a side view illustrating the carriage of FIG. 2.

As shown in FIGS. 2 and 3, a carriage 1 for conveying loads runs on a guide rail 2 laid on a ceiling. The loads are loaded and unloaded at a plurality of stations (not shown) provided along the rail 2. The carriage 1 has a drive wheel 3 and a driven wheel 4 to run on the guide rail 2. The guide rail 2 has a pair of flanges 2$a$. The carriage 1 has guide wheels 5$a$, 5$b$, which engage the flange 2$a$ of the guide rail 2. The guide wheels 5$a$, 5$b$ suspend the carriage 1 from the guide rail 2. A bracket 11 is provided on the carriage 1 for supporting the drive wheel 3 and the driven wheel 4. The structure for supporting the drive wheel 3, the driven wheel 4 and the guide wheels 5$a$, 5$b$ is basically the same as that of a previous Japanese patent application filed by the present assignee (Japanese Unexamined Patent Publication No. 8-72709). The carriage 1 has a drive motor 6. The drive motor 6 is a three-phase induction motor and rotates the drive wheel 3 thereby moving the carriage 1 along the rail 2.

Figure 1:
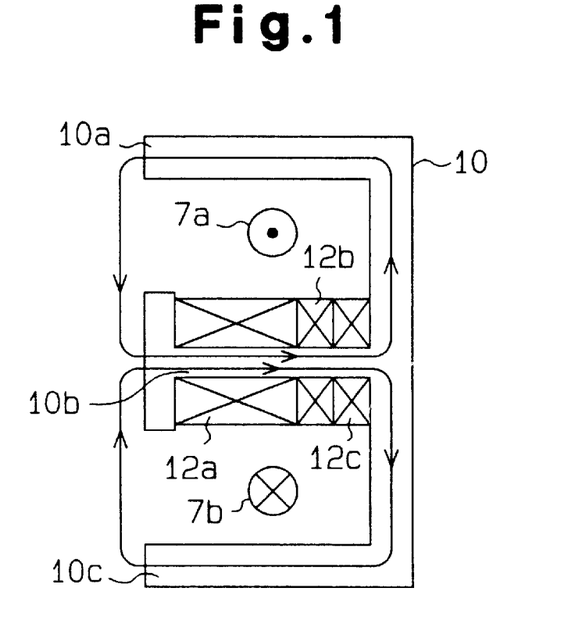
FIG. 1 is a diagrammatic side view illustrating a pickup coil unit according to a first embodiment of the present invention.

As shown in FIG. 2, upper and lower power supply lines 7$a$ and 7$b$ are laid an the side of the guide rail 2 by a pair of support arms 8. Each power supply line 7$a$, 7$b$ is formed by a single litz wire and is connected to a power supply unit 9 installed on the ground. The power supply unit 9 supplies alternating voltage to the power supply lines 7$a$, 7$b$. In this embodiment, the voltage of the power supply unit 9 is a high frequency sinusoidal voltage of 200 volts and 10 kilohertz. As shown in FIG. 1, the directions of the current through the power supply lines 7$a$, 7$b$ are opposite to each other.

The carriage 1 has a fore-and-aft pair of ferrite cores 10, which face the power supply lines 7$a$ and 7$b$ and have a cross section that nearly forms the shape of an "E". Each ferrite core 10 is secured to the bracket 11 with a supporter 11$a$ in between.

As shown in FIG. 1, each ferrite core 10 has an upper projection 10$a$, a middle projection 10$b$ and a lower projection 10$c$. The upper power supply line 7$a$ is located between the upper projection 10$a$ and the middle projection 10$b$, whereas the lower power supply line 7$b$ is located between the middle projection 10$b$ and the lower projection 10$c$. First, second and third pickup coils (induction coils) 12$a$, 12$b$, 12$c$ are wound about the middle projection 10$b$. The coils 12$a$ to 12$c$ are arranged along the longitudinal direction of the projection 10$b$ and have different values of self inductance. The ferrite core 10 and the coils 12$a$ to 12$c$ constitute a pickup coil unit.

The first coil 12$a$ functions as an electric power source for a power system, which actuates the drive motor 6. The second coil 12$b$ functions as an electrical power source for a sequence system, which includes relays. The third coil 12$c$ functions as an electrical power source for a control system, which controls the motor 6. The coils 12$a$ to 12$c$ in the front ferrite core 10 are connected with the coils 12$a$ to 12$c$ in the rear ferrite core 10 in series, respectively.

The type of wire and the number of turns in each coil 12$a$ to 12$c$ are determined in accordance with required voltages and currents. Also, the number of coils may be changed in accordance with the number of required voltages and the number of devices that are simultaneously activated. In this embodiment, a stranded wire having a diameter of a few millimeters is used in the coils 12$a$ to 12$c$. The first coil 12$a$, which generates DC300V, is constituted by a wire of twenty-five turns. The second coil 12$b$, which generates DC24V, is constituted by a wire of two turns. The third coil 12$c$, which generates DC5V, is constituted by a wire of a single turn. The wire of the coil 12$a$, which is connected to the power system, has relatively large diameter, whereas the wire of the coil 12$c$, which is connected to the control system, has a relatively small diameter.

Figure 5:
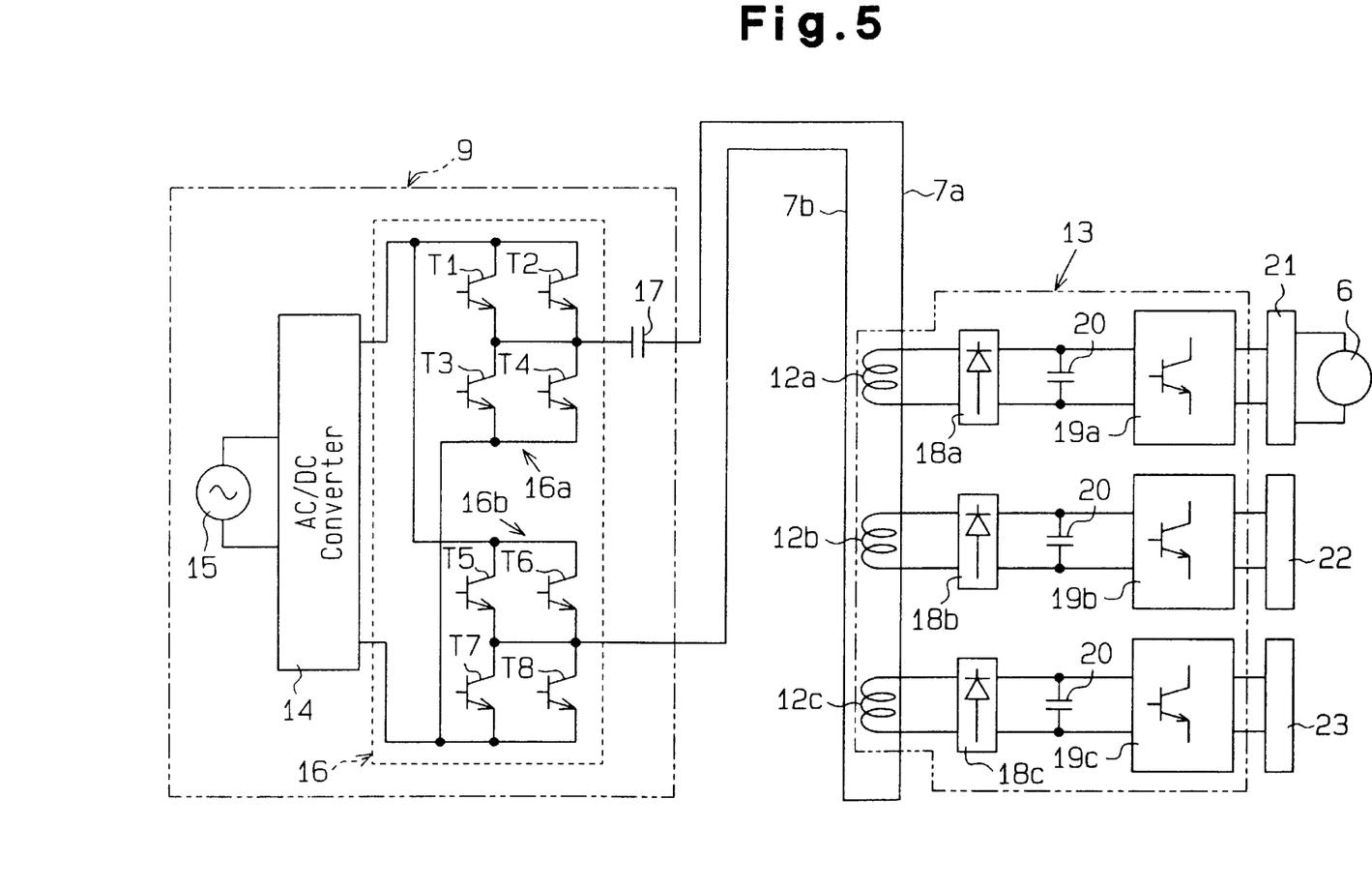
FIG. 5 is a circuit diagram illustrating a power supply unit according to the first embodiment.

As shown in FIG. 5, the power supply unit 9 on the ground side includes an AC/DC converter 14. The AC/DC converter 14 is connected to a 3-phase power supply 15 having a voltage of 200V and 60 hertz and converts the voltage from the power supply 15 to a 200V DC voltage. A DC/AC converter 16, connected to the AC/DC converter 14, receives the DC voltage from the AC/DC converter 14.

The DC/AC converter 16 includes a first driver section 16$a$ and a second driver section 16$b$, which are connected in parallel to the AC/DC converter 14. The first driver section 16$a$ has an output terminal connected to the power lines 7$a$ via the resonance capacitor 17. The second driver section 16$b$ has an output terminal connected to the other power line 7$b$.

The first driver section 16$a$ includes two upper transistors T1, T2 and two lower transistors T3, T4. The collectors of the upper transistors T1, T2 are connected to the positive terminal of the AC/DC converter 14. The emitters of the lower transistors T3, T4 are connected to the negative terminal of the AC/DC converter 14. The emitters of the upper transistors T1 and T2 are connected to the collectors of the lower transistors T3 and T4. The nodes between the emitters of the transistors T1, T2 and the collectors of the transistors T3, T4 form an output terminal of the first driver section 16$a$.

The second driver section 16b includes two upper transistors T5, T6 and two lower transistors T7, T8. The collectors of the upper transistors T5, T6 are connected to the positive terminal of the AC/DC converter 14. The emitters of the lower transistors T7, T8 are connected to the negative terminal of the AC/DC converter 14. The emitters of the upper transistors T5 and T6 are connected to the collectors of the lower transistors T7 and T8. The nodes between the emitters of the transistors T5, T6 and the collectors of the transistors T7, T8 form an output terminal of the second driver section 16b.

The ON/OFF actions of the individual transistors T1–T8 are controlled by a controller (not shown). As a result of this control, the DC/AC converter 16 supplies a high frequency sinusoidal voltage of 200 volts and 10 kilohertz to the power supply lines 7a, 7b. This ON/OFF control will be discussed more specifically. The ON/OFF actions of the upper transistors T1, T2 in the first driver section 16a and the lower transistors T7, T8 in the second driver section 16b are synchronously controlled. The ON/OFF actions of the lower transistors T3, T4 in the driver section 16a and the upper transistors T5, T6 in the driver section 16b are synchronously controlled. That is, while the upper transistors T1, T2 and the lower transistors T7, T8 are enabled, the lower transistors T3, T4 and the upper transistors T5, T6 are disabled. While the upper transistors T1, T2 and the lower transistors T7, T8 are disabled, on the other hand, the lower transistors T3, T4 and the upper transistors T5, T6 are enabled.

A power supply unit 13, which is mounted on the carriage 1, will hereafter be described.

The power supply unit 13 includes AC/DC converters (rectifiers) 18a to 18c and choppers 19a to 19c. Each converter 18a to 18c and each chopper 19a to 19c correspond to one of the coils 12a to 12c. specifically, the coils 12a to 12c are connected to the input terminals of the AC/DC converters 18a to 18c, respectively, and the output terminals of the converters 18a to 18c are connected to the choppers 19a to 19c, respectively. Smoothing capacitors 20 are connected between the converters 18a to 18c and the choppers 19a to 19c. In FIG. 5, each pair of fore-and-aft coils 12a to 12c are represented as single coils 12a to 12c.

The output terminal of the chopper 19a is connected to the drive motor 6 via an inverter 21. The chopper 19a outputs DC voltage of 300V. The inverter 21 receives the direct voltage from the chopper 19a and converts the direct voltage into a 3-phase AC voltage. The inverter 21 then outputs the AC voltage to the drive motor 6. The chopper 19b outputs the DC voltage of 24V to a driver 22. The chopper 19c outputs the DC voltage of 5V to a controller 23. The controller 23 includes a microcomputer and controls starting and stopping of the carriage 1 based on commands from a drive operation controller (not shown).

The operation of the above described devices will hereafter be described.

The controller 23 outputs control signals to the inverter 21 in accordance with commands from the drive operation controller. The drive motor 6 is controlled by signals from the inverter 21 and moves the carriage 1 along the rail 2. Accordingly, loads are transported between stations.

As the power supply unit 9 supplies a high frequency sinusoidal voltage of 200V and 10 kilohertz to the power supply lines 7a, 7b, magnetic flux is generated about the power supply lines 7a and 7b. Changes in the magnetic flux cause the pickup coils 12a to 12c to generate induced electromotive force. The induced electromotive forces in the coils 12a to 12c are converted to direct currents by the AC/DC converters 18a to 18c. The converted voltages are smoothed by the smoothing capacitor 20 and outputted to the choppers 19a to 19c.

The chopper 19a outputs a stable DC voltage of 300V as the electric power source for the power system, and the motor 6 is driven by the voltage of the chopper 19a transmitted via the inverter 21. The chopper 19b outputs a stable DC voltage of 24V as the electric power source for the sequence control system. The chopper 19c outputs a stable DC voltage of 5V as the electric power source for the control system, which includes the controller 23.

As shown in FIG. 1, the directions of currents through the lines 7a, 7b are opposite to each other. When the current in the upper line 7a flows forward, the current in the lower line 7b flows backward. The flux generated about the line 7a flows in a counterclockwise direction, whereas the flux generated about the line 7b flows in a clockwise direction. Since the middle projection 10b is located between the lines 7a and 7b, the directions of the fluxes about the lines 7a and 7b are the same at the projection 10b. Thus, changes in the fluxes about the lines 7a and 7b effectively generate induced electromotive force in the coils 12a to 12c.

Figure 4:
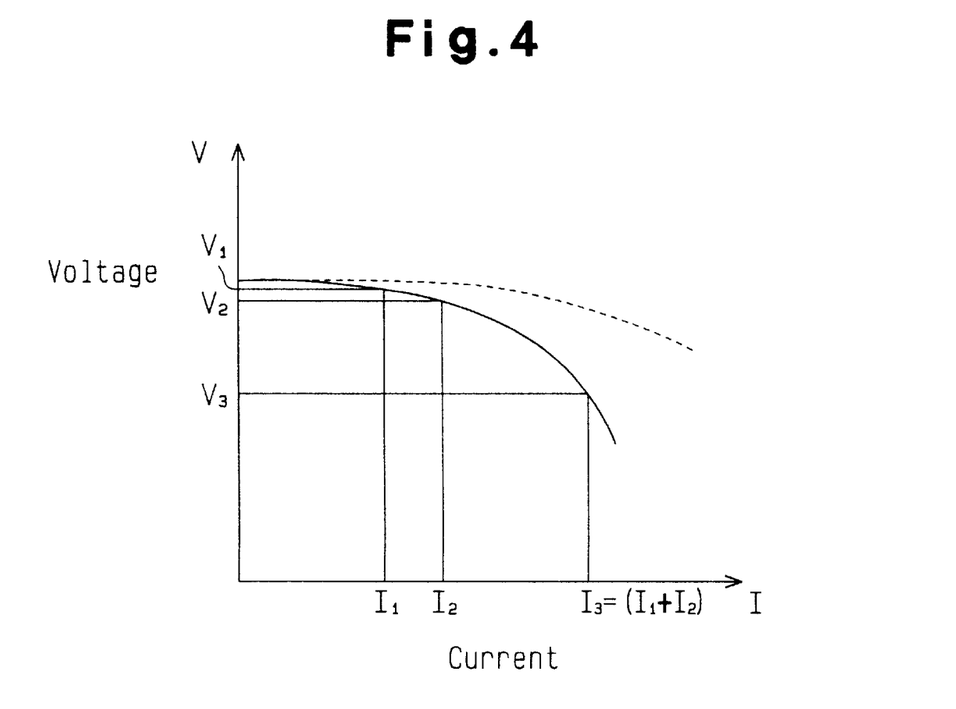
FIG. 4 is a graph showing the drooping characteristic of the pickup coil of FIG. 1.

In the non-contact power supply system, the relationship between the output current and the output voltage of the coils 12a to 12c is represented by the graph of FIG. 4. As the current becomes greater, the voltage becomes lower. This is the drooping characteristic. The larger the number of turns of a coil, the steeper the decrease of the output voltage becomes. The decrease of the output voltage is proportionate to the square of the number of turns of the coil. In FIG. 4, the broken line shows the decrease of the voltage when the number of turns of the coil is small, whereas the solid line shows the decrease of the voltage when the number of turns of the coil is great.

If an induced electromotive force generated by a single coil is used as an electric power source for a plurality of actuating systems, the current supplied to the power system becomes greater and the voltage supplied to other actuating systems becomes low. However, in the above embodiment, the separate coils 12a to 12c are provided for the power system and the other systems, respectively. Thus, even if the current in the power system is great and its voltage becomes low, voltage to the control system is not lowered.

The above embodiment has the following advantages.

The coils 12a to 12c individually output voltages of different magnitudes to different systems. That is, the coil 12a for the power system is independently constructed from the coil 12c for the control system. Therefore, when the current to the power system is increased and thus the voltage to the power system is lowered, the voltage supplied to the control system will not be lowered. This stabilizes voltage supply to each system. Surge voltage is generated in the power system when switching is performed in the system, or when the system is turned on or off. However, the device of the first embodiment prevents the surge voltage from being inputted to the CPU of the controller 23. Further, when electric power to the power system is shut off because of overload, the control system continues operating.

The voltages supplied to the choppers 19a to 19c from the coils 12a to 12c are different in accordance with the required magnitudes of voltage in each system. Thus, the chopper 19c to which a lower voltage is applied may be constituted by a device having a low withstand voltage. This reduces the cost of the chopper 19c.

Since the coil 12c for the control system has a small number of turns, the coil 12c is not affected by the drooping characteristic. That is, output voltage of the coil 12c is not significantly lowered when the output current is increased. This stabilizes the voltage supplied to the controller 23.

As shown in FIG. 1, the coils 12a to 12c are arranged in the axial direction of the middle projection 10b of the ferrite core 10. Therefore, the distance between the middle projection 10b and the other projections 10a, 10c can be smaller than where coils are overlaid on one another. Thus, room for the coils 12a to 12c can be easily obtained between the projections 10a to 10c.

The fluxes about the lines 7a, 7b flow in the same direction at the middle projection 10b. This results in a greater flux intersecting the coils 12a to 12c thereby effectively generating induced electromotive force.

The wire of the coil 12a, which is connected to the power system, has a large diameter, and the wire of the coil 12c, which is connected to the control system, has a small diameter. Since thinner wires are less expensive than large wires, the preferred embodiment reduces the manufacturing cost of coils compared to an apparatus where all the coils 12a to 12c are constituted by large wires. Also, using small wires requires less space for winding coils.

If the systems do not have the common ground such as the body of the carriage 1, the outputs of the coils 12a to 12c can be electrically insulated from each other. In this case, a breakdown of the inserter 21 in the power system does not affect the control system.

Figure 6:
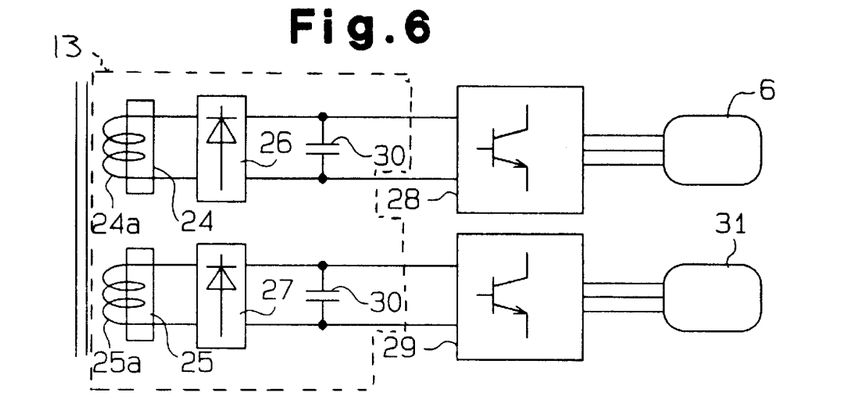
FIG. 6 is a circuit diagram illustrating a power supply unit on a carriage according to a second embodiment.

A second embodiment of the present invention will hereafter be described with reference to FIG. 6.

The differences from the first embodiment will mainly be discussed below, and like or the same reference numerals are given to those components that are like or the same as the corresponding components of the first embodiment.

The second embodiment is different from the first embodiment in that the carriage 1 includes a plurality (for example, two) of power systems and a receiving circuit. The receiving circuit has a plurality of receivers and rectifiers, the numbers of which correspond to the number of the power systems.

The power supply unit 13 includes two cores 24, 25 that function as receivers. Coils 24a, 25b are wound about the cores 24, 25. The unit 13 also includes rectifiers 26, 27, inverters 28, 29 and a pair of smoothing capacitors 30. Each rectifier 26, 27, each inverter 28, 29 and each capacitor 30 corresponds to one of the coils 24a, 25a. The cores 24, 25 are separated and independent from each other. The capacitors 30 are connected between each rectifier 26, 27 and each inverter 28, 29. The rectifier 26, the capacitor 30 and the inverter 28 constitute a receiving circuit, whereas the rectifier 27, the capacitor 30 and the inverter 29 constitute another receiving circuit. The inverter 28 is connected to the drive motor 6 and the inverter 29 is connected to an elevator motor 31, which raises and lowers an elevating table or a load holder. The numbers of turns of the coils 24a, 25a are determined such that required voltages in the loads are obtained without increasing the voltages generated by the coils 24a, 25a.

If a carriage includes two or more actuating devices that are simultaneously activated with the power system, which requires a great voltage, voltage supplied to the power system is lowered because of the drooping characteristic. For example, if a carriage has a drive motor, an elevator motor and a single receiver (a core and a coil), activating the motors at the same time lowers output voltage of the electric power source connected to the power system because of the drooping characteristic. In the graph of FIG. 4, I1 represents a current consumed by the drive motor, while I2 represents a current consumed by the elevator motor. When the motors are activated individually, the voltages supplied to the motors are V1 and V2. However, when the motors are activated at the same timer the consumed current is increased to I3, which is the sum of the I1 and I2 (I3=I1+I2). At this time, the voltage to the power system drops to V3. Thus, activating the motors at the same time results in insufficient electric power for the motors. However, in the second embodiment, the problem is solved by providing a plurality (two in this embodiment) of independent receivers, each corresponding to one of the loads (the motors). Further, providing a single receiver having a single coil increases the number of turns of the coil to obtain the output current I3. This deteriorates the drooping characteristic. However, in this embodiment, the number of the receivers corresponds to the number of the loads. This decreases the number of turns of each coil and improves the drooping characteristic.

Further, each core 24, 25 and each coil 24a, 25a correspond to one of the loads. Therefore, the voltage required by each load is obtained by changing the number of turns of the coils 24a and the coil 25a, or changing the length of the cores 24 and 25. Thus, the receivers of the second embodiment require no choppers (step-up or step-down transformers).

In the second embodiment, choppers may be connected between the rectifiers 26, 27 and the inverters 28, 29.

It should be apparent to those skilled in the art that the present invention may be embodied in many other specific forms without departing from the spirit or scope of the invention. Particularly, it should be understood that the invention may be embodied in the following forms.

Figure 7:
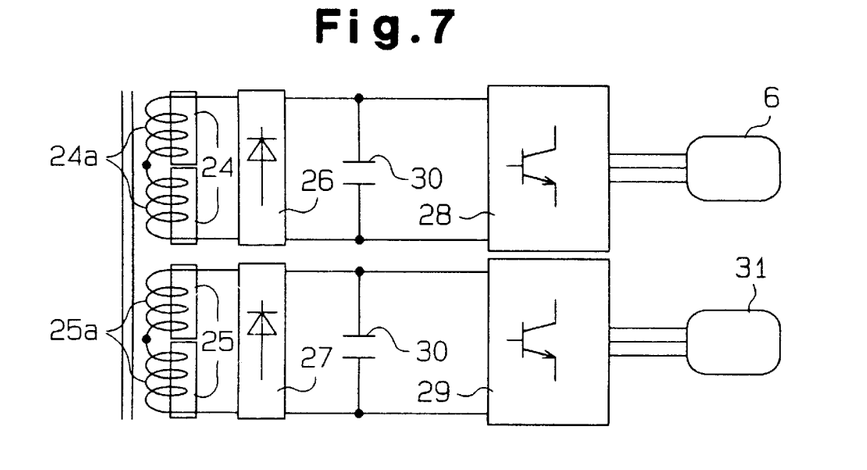
FIG. 7 is a circuit diagram illustrating a power supply unit on a carriage according to another embodiment.

(1) In the second embodiment, each receiver may have a pair of coat 24, 25 and a pair of coils 24a, 25a connected in series as shown in FIG. 7. This construction improves the drooping characteristic and reduces the number of turns of the coils 24a, 25a, thereby reducing fluctuations of the output voltage.

Figure 9A:
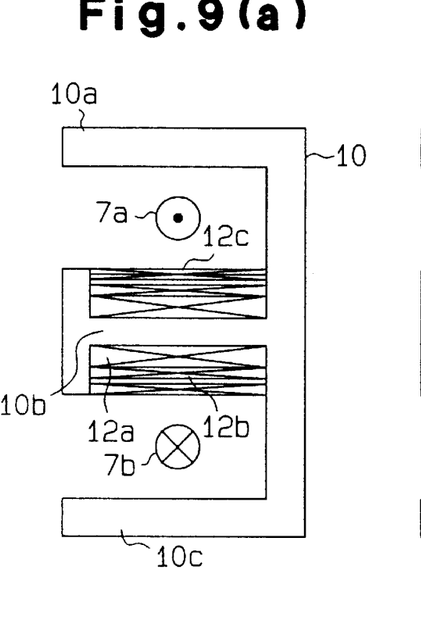

(2) In the first embodiment, the positions of the coils 12a to 12c may be changed, For example, as shown in FIG. 9(a), the coil 12a may be wound about the middle projection 10b, and the coil 12b and the coil 12c may be overlaid on the coil 12a. Fluxes, the same number of which is the same as that of the first and second embodiments, intersect the coils 12a to 12c. Therefore, changing the positions of the coils 12a to 12c does not affect the performance of the non-contact power supply unit.

Figure 9B:
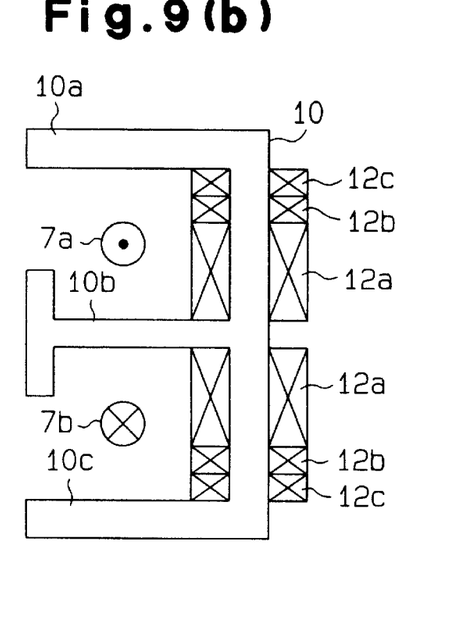

(3) As shown in FIG. 9(b), the coils 12a to 12c may be divided and wound about the parts connecting the projections 10a to 10b and 10c to 10b. In this case, the integrated numbers of turns of the coils 12a to 12c are doubled from the number of turns of the coils 12a to 12c in the first embodiment for obtaining the same induced electromotive force as the above embodiments. The flux about the line 7a intersects the upper group of the coils 12a to 12c, whereas the flux about the line 7b intersects the lower group of the coils 12a to 12c. The amount of flux intersecting both groups of the coils 12a to 12c is the same as that of the previous embodiments. Therefore, the performance of the non-contact power supply unit is the same as that of the first and second embodiments.

(4) A coil used for an electric power source of a low output voltage has a coil of a small number of turns. The coil thus is not affected by the drooping characteristic. Therefore, if small voltage fluctuations are permitted in the electric power source, choppers may be omitted from the unit. In this case, the induced electromotive force of the coil is used as an electric power source after being converted into DC current by an AC/DC converter and being smoothed by a capacitor. This reduces the number of parts in the power source unit 13 thereby simplifying its construction.

Figure 8:
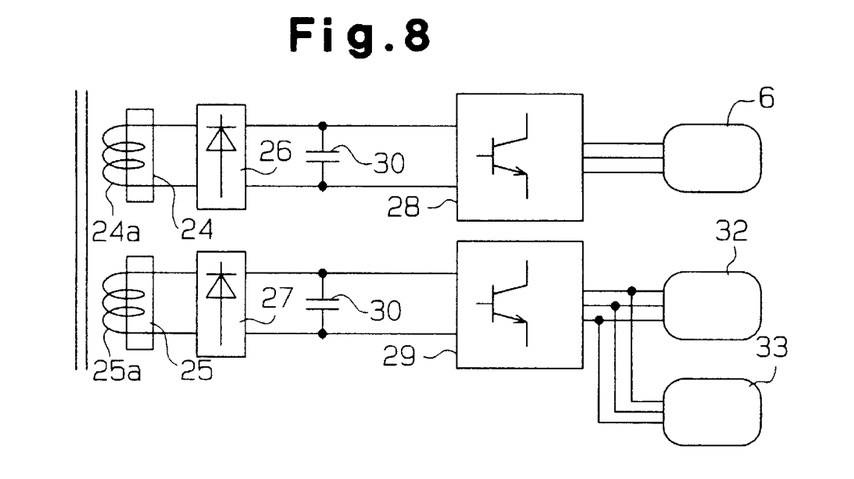
FIG. 8 is a circuit diagram illustrating a power supply unit on a carriage according to another embodiment.

(5) As shown in FIG. 8, if a power system has three or more loads (three loads 6, 32, 33 in this embodiment) and some of these loads (the loads 32 and 33) consume small amounts of electric power, the loads 32, 33 may be connected to the inverter 29 in parallel. Since the loads 32, 33 consume small amounts of electric power, connecting the loads 32, 33 to the same receiver (coil 25a) and to the same receiving circuit does not cause the voltages supplied to the loads 32, 33 to be affected by the drooping characteristic. If the power system includes three or more loads, two or more of these loads that are never simultaneously activated may be connected to a single power source in parallel. For example, a stacker crane has a drive motor and an elevator motor for ascending and descending a fork. The drive motor and the fork elevating motor are never activated at the same time. Thus, the motors may be connected in parallel as the loads 32, 33 in FIG. 8.

(6) If a carriage has a plurality of power systems consuming a great amount of electrical power, as well as a sequence system and a control system, a coil connected to one of the power systems, a coil connected to the sequence system and a coil connected to the control system may be wound about a single core. In this case, the coils for the other power systems may be wound about other cores, respectively. This construction prevents each system from being affected by the drooping characteristic.

(7) Sequence systems and control systems are activated by lower voltages than are power systems. Thus, a sequence system and a control system may share a single coil, a single AC/DC converter and a single smoothing capacitor. In this case, the sequence system and the control system each have an independent chopper. Since this construction separates the sequence system and the control system from the power system, which is vulnerable to the drooping characteristic, using the single coil for the control system and the sequence system causes little problem. This construction reduces the number of coils and AC/DC converters thereby simplifying the unit.

(8) A plurality of coils, each connected to a different power system, may be independently wound about a single core.

(9) In the above embodiments, a single wire is folded to form the power supply lines 7a and 7b, and the lines 7a and 7b are arranged in parallel and close to each other. However, power supply lines may be arranged with such a distance in between that the fluxes of the lines do not interfere each other. Also, the direction of the currents in the lines may be the same. In this case, two groups of coils are employed. One group of coils intersects the flux about the line 7a, whereas the other group of coils intersects the flux about the line 7b.

(10) Voltages supplied to each system are riot limited to the voltages listed above. However, the voltages may be varied in accordance with required voltages of devices in each system. Further, the electric power from the ground power supply unit 9 may have a voltage and a frequency other than 200 volts and 10 kilohertz.

(11) Instead of at tore-and-aft pair of cores 10, a single ferrite core may be provided on the carriage 1. Also, three or more ferrite cores 10 may be provided on the carriage 1. In this case, the same coils 12a, 12b or 12c on each ferrite core are connected in series, respectively.

(12) A single power supply line may be used instead of the pair of lines 7a and 7b. The ferrite core 10 may have a shape other than the shape of an "E", for example the ferrite core 10 may have a "C" shaped cross section.

(13) Instead of an unmanned conveying system including a carriage 1 running on the rail 2 laid on a ceiling, the present invention may be adopted to an unmanned conveying system including a carriage running on a rail laid on the ground. The present invention may be employed in a stacker crane used in an automatic warehouse system.

Therefore, the present examples and embodiments are to be considered as illustrative and not restrictive and the invention is not to be limited to the details given herein, but may be modified within the scope and equivalence of the appended claims.

What is claimed is:

1. An apparatus for feeding electric power to a movable body in a non-contact manner, wherein the movable body runs on a guide rail, the apparatus comprising:

an electric power line, laid along the guide rail, wherein the movable body is powered by electric power from the power line;

a plurality of coils including a first coil, which are positioned in the movable body, for generating induced electromotive force as a drive voltage according to the electric power, and wherein the plurality of coils generate a plurality of voltages;

a plurality of loads including a first load, which are connected to the coils, wherein one of the voltages generated by the first coil drives the first load while the voltage generated by another coil drives at least one other load; and a core, wherein the plurality of coils are wound about the core, and wherein the core is substantially E shaped such that the core includes a core body having a first end and a second end, a first projection positioned at a first end of the core body, a second projection positioned at a middle portion of the core body, and a third projection positioned at a second end of the core body, wherein the coils are wound about the second projection at different positions from one another.

2. The apparatus according to claim 1, wherein first and second power lines are provided for the core, and the first power line is positioned between the first projection and the second projection, and wherein the second power line is positioned between the second projection and the third projection, and wherein the directions of current flowing on the first and second power line are opposed each other.

3. An apparatus for feeding electric power to a movable body in a non-contact manner, wherein the movable body runs on a guide rail, the apparatus comprising:

an electric power line, laid along the guide rail, wherein the movable body is powered by electric power from the power line;

a plurality of coils including a first coil, which are positioned in the movable body, for generating induced electromotive force as a drive voltage according to the electric power, and wherein the plurality of coils generate a plurality of voltages;

a plurality of loads including a first load, which are connected to the coils, wherein one of the voltages generated by the first coil drives the first load while the voltage generated by another coil drives at least one other load; and a plurality of cores, wherein each coil is wound about one of the cores.

4. An apparatus for feeding electric power to a movable body in a non-contact manner, wherein the movable body runs on a guide rail, the apparatus comprising:

an electric power line, laid along the guide rail, wherein the movable body is powered by electric power from the power line;

a plurality of coils including a first coil, which are positioned in the movable body, for generating induced electromotive force as a drive voltage according to the electric power, and wherein the plurality of coils generate a plurality of voltages;

a plurality of loads including a first load, which are connected to the coils, wherein one of the voltages generated by the first coil drives the first load while the voltage generated by another coil drives at least one other load; and a core that substantially surrounds the power line, wherein the plurality of coils are wound about the core.

* * * * *

UNITED STATES PATENT AND TRADEMARK OFFICE
CERTIFICATE OF CORRECTION

PATENT NO.   : 6,089,362
DATED        : July 18, 2000
INVENTOR(S)  : Masaki Takasan et al.

It is certified that error appears in the above-identified patent and that said Letters Patent is hereby corrected as shown below:

Column 3,
Line 62, please change "laid an" to -- laid on --;

Column 8,
Line 5, please change "timer" to -- time --;

Column 9,
Line 57, please change "riot" to -- not --; and
Line 63, please change "tore-and-aft" to -- fore-and-aft --.

Signed and Sealed this

Thirtieth Day of April, 2002

Attest:

JAMES E. ROGAN
*Attesting Officer*    *Director of the United States Patent and Trademark Office*